United States Patent
Leger et al.

[11] Patent Number: 6,038,524
[45] Date of Patent: Mar. 14, 2000

[54] METHOD AND APPARATUS FOR MEASURING THE INCLINATION OF A SPIN AXIS OF A CARRIER

[75] Inventors: Pierre Leger, Issy les Moulineaux; Calogero Fiaccabrino, Cergy, both of France

[73] Assignee: Sagem SA, Paris, France

[21] Appl. No.: 08/976,047

[22] Filed: Nov. 21, 1997

[30] Foreign Application Priority Data

Nov. 22, 1996 [FR] France ................................. 96 14301

[51] Int. Cl.[7] .............................................. G01C 19/18
[52] U.S. Cl. ........................................... 702/151; 73/1.77
[58] Field of Search ............................. 702/151; 73/1.77

[56] References Cited

U.S. PATENT DOCUMENTS

| | | | |
|---|---|---|---|
| 5,270,959 | 12/1993 | Matsuzaki et al. | 364/571.02 |
| 5,283,754 | 2/1994 | Stieler et al. | 364/571.02 |
| 5,313,850 | 5/1994 | Finvold et al. | 74/5.9 |
| 5,379,228 | 1/1995 | Asplund | 364/434 |

FOREIGN PATENT DOCUMENTS

| | | |
|---|---|---|
| 0109784 | 10/1983 | European Pat. Off. |
| 19505855 | 2/1996 | Germany . |
| 2049931 | 12/1980 | United Kingdom . |

*Primary Examiner*—Marc S. Hoff
*Assistant Examiner*—Linh Nguyen
*Attorney, Agent, or Firm*—Larson & Taylor

[57] ABSTRACT

To measure, in a reference frame, angular displacements of a privileged axis tied to a carrier, angular velocities or angular increments of the carrier are measured about two axes tied to the carrier, which axes are orthogonal to each other and at an angle of about 90° the privileged axis. Said mutually orthogonal axes are caused to rotate at high speed about said privileged axis. The angular positions of said mutually orthogonal axes about the privileged axis are determined continuously relate to a reference position. Their angular displacements are calculated by integrating their angular velocities while taking account of said angular positions of the orthogonal axes about the privileged axis.

11 Claims, 1 Drawing Sheet

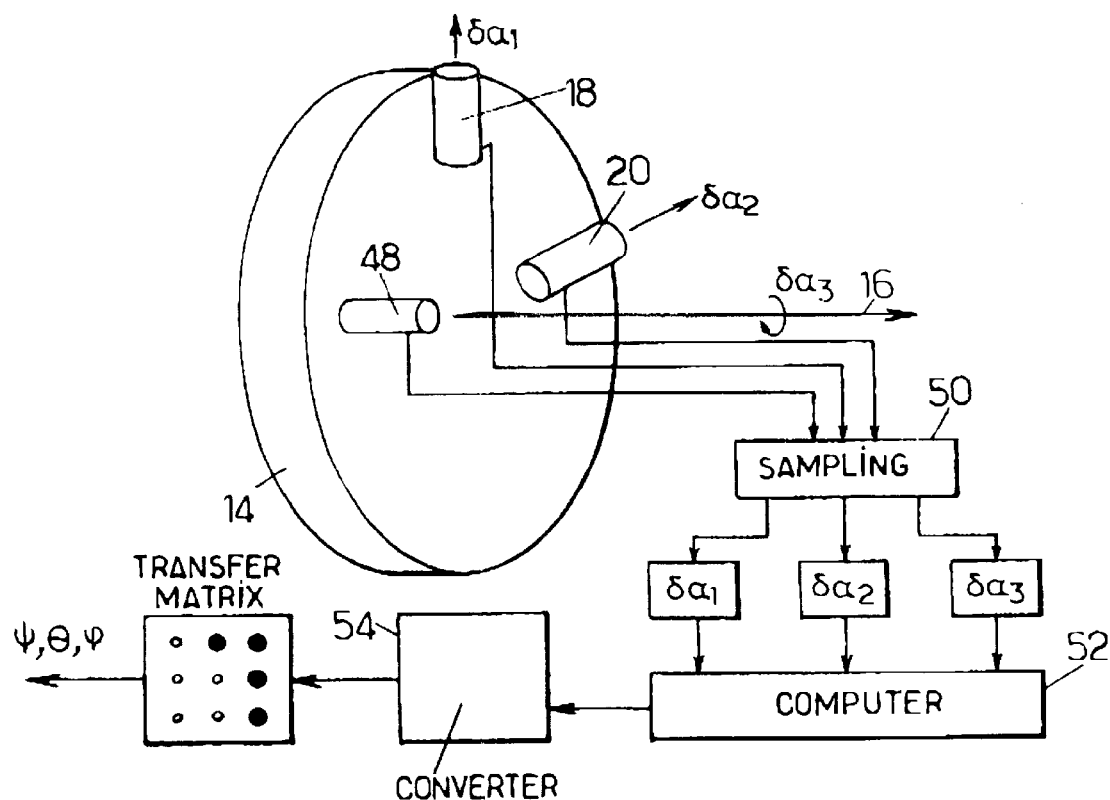

METHOD AND APPARATUS FOR MEASURING THE INCLINATION OF A SPIN AXIS OF A CARRIER

BACKGROUND OF THE INVENTION

The present invention relates to measuring, in a reference frame, angular displacements of a spin axis of a carrier moving along a trajectory. The angles of inclination are generally angles referred to as "yaw" and "pitch".

There are already numerous apparatuses in existence for measuring the inclination of a privileged axis tied to a carrier. Use can be made in particular of spinning mass gyros mounted on gymbals provided with angle sensors. The rotary contacts and the bearings of such apparatus reduce their reliability. Measurement errors are cumulative over time. Strap down systems are also known having three gyro measurement axes, using spinning mass, laser, or optical fiber rate gyros. Such solutions are expensive and often bulky.

A particularly important, although non-exclusive, application of the invention lies in the guidance system for a spinning projectile having a short flight time. It is then necessary at all times and to within a few degrees to know both the angle of inclination and the roll angle, even though the speed of rotation can be several revolutions per second. On such projectiles, it has been common practice to use free gyros having spinning masses driven by an electric motor or launched by a spring, by compressed gas, or by combustion gases. Such free gyros mounted on gymbols suffer from the drawbacks mentioned above. It is hardly possible to use a coupled-component inertial navigation system on such projectiles because the cost, mass, and volume of such systems are too great, and also because many such systems are sensitive to acceleration.

SUMMARY OF THE INVENTION

An object of the invention is to provide a method and apparatus of the above-defined kind that satisfy practical requirements better than previously known methods and apparatuses, in particular in that they make it possible to use sensors having few requirements, both concerning bias and setting relative to the carrier.

To this end, there is provided a method of measuring, in a reference frame, the angular displacements of a spin axis of a carrier, comprising the steps of:

measuring the angular speeds or angular increments of the carrier about two axes tied to the carrier, said axes being mutually orthogonal and at an angle equal to 90° or close to 90° relative to the spin axis, the spin being at a rotational speed which is as compared to a maximum rotational speed of the spin axis about the mutually orthogonal axes;

measuring angular positions of said mutually orthogonal axes about the spin axis are relative to a reference position; and computing said angular displacements by integrating said angular speeds taking said angular positions into account, typically without reference to other parameters.

Because of the rapid rotation about the spin axis (generally at an angular velocity that is at least ten times greater than any angular velocity that might exist about the other axes), the two angles of inclination obtained by integrating the measured angular velocities are relatively insensitive to the bias of the means used for measuring the angular velocities or to any setting error of said means, at least providing the speed of rotation remains substantially constant. It is thus possible to accept considerable drift concerning bias, and concerning the scale factor of the means for measuring rotation about the mutually orthogonal axes, and it is possible with low grade sensors to obtain accuracy that is sufficient in numerous applications. In contrast, rotation about the privileged axis (spin axis) must be measured by means that have low drift.

The angular position increments of the mutually orthogonal axes can be determined by sampling the angular position about the spin axis and the angular velocities measured about the two mutually orthogonal axes at a frequency which is high relative to the frequency of rotation of the orthogonal axes; the angular increments about the two mutually orthogonal axes are then integrated during the time intervals between taking two successive samples. A transformation matrix is computed for converting a frame tied to the mutually orthogonal axes and to the privileged axis into the reference frame, and the inclination angles are deduced from the terms of the matrix.

There is also provided an apparatus for measuring angular displacements of a spin axis of a carrier, that spins in operation about said axis, comprising two angle sensors having sensing axes that are mutually orthogonal and at least close to orthogonal to the spin axis, means for measuring an angular position of the carrier about the spin axis, and electronic computation means for computing angles of said spin axis relative to a predetermined position in a reference frame, from signals supplied by the angle sensors and by the means for measuring said angular position.

Advantageously, the means for measuring angular position are constituted by a free gyro suitable for being associated with the means for integrating increments. The reference frame is then an inertial frame. The use of a free gyro eliminates the problems of scale factor drift that are encountered with a rate gyro. Such use of a free gyro that is tied to the structure, in the so-called "strap down" disposition, is not to be found on present spinning projectiles. In addition, the rotation compensates for bias errors by averaging over the angular velocity sensors installed on the two mutually orthogonal axes.

It is advantageous to use the same technology both for the gyro and for the two angle sensors, for reasons of uniformity.

The gyro sensors are subjected to centrifugal acceleration. Consequently, it is advantageous to use sensors that are practically insensitive to such acceleration, which applies in particular to vibrating sensors. In addition, in free gyro mode, the anisotropic errors of a vibrating sensor are attenuated. Error reduction can be improved by inclining the input or sensing axes towards the spin axis.

In particular, it is possible to use electronic means of the type described in patent application FR 96 06618, which make it possible, in addition, to perform in situ calibration of the gyro.

The above characteristics and others appear more clearly on reading the following description of particular embodiments, given as non-limiting examples.

BRIEF DESCRIPTION OF THE DRAWING

The description refers to the accompanying drawing, in which the single FIGURE is a diagram showing one possible distribution of components for use on a spinning carrier.

DETAILED DESCRIPTION

In the example shown in the FIGURE, the apparatus is mounted on a carrier that spins about the spin axis 16.

Rotation about axis 16 can be measured by a free gyro 48 whose housing is fixed to the structure of the carrier. The advantage of using a free gyro as compared with using a rate gyro becomes more marked with increasing spin rate, and with increasing flight time over which measurements are to be performed. Angular sensors 18 and 20 are so located that their measurement axes be mutually orthogonal and close to perpendicular to the spin axis 16. They may be constituted either by a rate gyro or by a free gyro. In an advantageous embodiment, the sensors 18 and 20 are vibrating resonator devices, which have the advantage of being relatively insensitive to centrifugal acceleration. If the vibrating resonator sensors are used in free gyro mode, then their sensing axes are advantageously inclined at a known angle relative to the privileged axis. This causes the spin velocity to have a component along the sensing axis or input axis of each of the sensors 18 and 20, thereby reducing errors of anisotropy by averaging. For other types of sensor, it may be preferable to give the sensing or input axes of the sensors 18 and 20 orientations that are perpendicular to the privileged axis tied to the carrier, ignoring setting errors.

In particular, it is possible to use sensors having four vibrating beams of the type descried in document EP-93 401 471, associated with electronics (not shown) of the kind described in French patent application FR 96 06 618. The sensors 18 and 20 can have a large amount of drift (degrees/sec) as compared to the required accuracy (degrees/sec) for output angle drift, since automatic compensation is obtained due to rotation about the spin axis 16.

A sampling circuit 50 takes the values output by the sensors at a frequency that is commensurate with the rotational speed, frequently in the range 10 revolutions per second (rpm) to 20 rpm, computes the increments $\delta\alpha_1$, $\delta\alpha_2$ and $\delta\alpha_3$ each time samples are taken, and delivers the increments to the computation unit 52. In practice, the sampling rate will frequently be selected so that the increments $\delta\alpha_3$ are of the order of one degree of angle.

Inclinations may be computed by determining the transfer matrix for converting the rotating system of axes tied to the carrier 14 into a reference system. Computation is performed by integrating angle increments $\delta\alpha_1$ and $\delta\alpha_2$ at high frequency, each of which increments is measured over the duration of a sampling period corresponding to an angular increment $\delta\alpha_3$. Integration can make use of quaternion representation or of Euler parameters, and can be performed using a digital signal processor constituting computer 52. The inclination angles are extracted from the terms of the transfer matrix for converting from one axis system to the other. The stationary reference axis system can be defined by the positions of the spin axis and of the two mutually orthogonal axes at the instant when integration computation begins. A description of the computation enabling inclination angles to be obtained in a stationary axis system on the basis of the increments $\delta\alpha_1$, $\delta\alpha_2$ and $\delta\alpha_3$ is to be found in various documents, for example at pages 413–414 of the work "Navigation inertielle optimale et filtrage statistique" [Optimum inertial navigation and statistical filtering] by P. Faurre, published by Dunod, Paris, 1971.

The computation unit then determines the terms constituting successive quaternions and delivers them to a converter 54 which delivers the nine-term square matrix for transforming from one frame to the other, or merely the four terms that are required. In practice, the operations in 52 and 54 will generally be implemented by software.

There follow a few indications on one possible way of determining yaw angles $\psi$, roll angles $\phi$, and pitch angles $\theta$ of the carrier in an absolute frame, on the basis of the angular increments $\delta\alpha_1$, $\delta\alpha_2$ and $\delta\alpha_3$ supplied by the sensors and representative of angular velocities about the two mutually orthogonal axis and about the privileged axis (the roll axis) constituting the axis system $T_b$ tied to the carrier.

The rotation for converting from an initial reference system of axis $T_i$ to the system $T_b$ at a given instant can be represented by a matrix $T_{i/b}$ having nine terms representing the projections $e_1$, $e_2$, and $e_3$ of the unit vector of rotation e on the three axes of the inertial axis system, and an angle of rotation $\beta$ (Euler's theorem).

$$(Ti/b)^{-1} = \begin{bmatrix} t_{11} & t_{12} & t_{13} \\ t_{21} & t_{22} & t_{23} \\ t_{31} & t_{32} & t_{33} \end{bmatrix}$$

To obtain the angles $\psi$, $\phi$ and $\theta$, it suffices to have four terms of the matrix available. The following apply:

$\psi$=Arc sin $(-t_{12})$
$\theta$=Arc sin $(t_{13})$
$\phi$=Arc tan $(-t_{23}/-t_{33})$ The terms of the matrix can be obtained more easily by representing each rotation by a quaternion (1):

$$Q = \begin{cases} \rho_1 = e_1 \sin(\beta/2) \\ \rho_2 = e_2 \sin(\beta/2) \\ \rho_3 = e_3 \sin(\beta/2) \\ \rho_4 = \cos(\beta/2) \end{cases} \quad (1)$$

The matrix $T_{i/b}$ can then be expressed in a form that makes use only of $\rho_1$, $\rho_2$, $\rho_3$ and $\rho_4$.

Such quaternion representation has two advantages. Firstly the quaternion of the product of two rotations (and thus of a preceding rotation and an increment of rotation) is equal to the product of the two quaternions, and it is possible to write $Q_{n+1}=Q_n+dQ=Q_n \otimes Q$. Also, dQ can be written, when sampling takes place at a sufficiently high rate, in the following simplified form:

$$dQ=1+\tfrac{1}{2}(\rho_1 i+\rho_2 j+\rho_3 k)dt$$

where:

$\rho_1$, $\rho_2$, $\rho_3$ are components of the instantaneous rotation vector, which can be represented by:

$$\delta\alpha_1, \delta\alpha_2, \delta\alpha_3$$

dt is the sampling interval $$i^2=j^2=k^2=-1.$$

The product $Q \otimes dQ$ thus reduces to integration, making it possible to discover the terms that are involved in the transfer matrix $T_{i/b}$.

All of the necessary computations can be performed digitally by software. The electronics associated with the sensors will generally include a card enabling vibration to be sustained in the gyros, the amplitude of the vibration to be servo-controlled, and the measurement signals to be provided. A second card may include a digital signal processor that performs the computations and, also, corrections that make use of initial modelling, e.g. of variation in response as a function of temperature.

The apparatus can easily be incorporated in a system for controlling the trajectory of a guided projectile of short flight time. It has the advantage of being capable of being put into operation immediately, of having weight that can be very low, and of power consumption that can also be very low.

We claim:

1. A method of measuring, in a reference frame, angular displacements of a spin axis of a carrier movable along a path, comprising the steps of:

measuring the angular speeds or angular position increments of the carrier about two axes tied to the carrier, said axis being mutually orthogonal and at an angle equal to 90° or close to 90° relative to the spin axis, the spin being at a rotational speed which is high as compared to a maximum rotational speed of the spin axis about the mutually orthogonal axes;

measuring angular positions of said mutually orthogonal axes about the spin axis relative to a reference position; and computing said angular displacements by integrating said angular speeds and taking said angular positions into account.

2. A method of measuring, in a reference frame, angular displacements of a spin axis of a carrier movable along a path, comprising the steps of:

measuring the angular speeds or angular position increments of the carrier about two axes tied to the carrier, said axes being mutually orthogonal and at an angle equal to 90° or close to 90° relative to the spin axis, the spin being at a rotational speed which is high as compared to a maximum rotational speed of the spin axis about the mutually orthogonal axis;

measuring angular positions of said mutually orthogonal axes about the spin axis relative to a reference position; and computing said angular displacements by integrating said angular speeds and taking said angular positions into account, wherein the angular position increments of the mutually orthogonal axes are measured by sampling the angular positions about the spin axis and angular velocities measured about the mutually orthogonal axes, sampling being performed at a frequency that is high as compared with an angular frequency of the orthogonal axes about the spin axis.

3. A method according to claim 2, wherein the angular position increments about the two mutually orthogonal axes are integrated during time intervals between two samples of the angular position about the spin axis, further comprising the steps of computing a transfer matrix for converting from a frame tied to the mutually orthogonal axes to the reference frame, and deriving inclination angles from terms of the matrix.

4. A method according to claim 3, wherein the reference frame is a reference system of axis having one axis that coincides with a predetermined initial orientation of the spin axis.

5. Apparatus for measuring angular displacements of a spin axis of a carrier that spins in operation about said axis in a reference frame, comprising two angle sensors having sensing axes that are mutually orthogonal and are at least close to orthogonal to the spin axis, means for measuring an angular position of the carrier about the spin axis, and electronic computation means for computing angles of said spin axis relative to a predetermined position in a reference frame, from signals supplied by the angle sensors and by the means for measuring said angular position, said computation means being arranged to determine a transfer matrix for converting a system tied to the carrier and including the spin axis to the reference frame.

6. Apparatus according to claim 5, wherein the means for measuring angular position comprise a free gyro associated with integration means.

7. Apparatus according to claim 6, wherein said angle sensors are rate gyros.

8. Apparatus according to claim 7, wherein the free gyro and the rate gyros are vibrating resonator gyros.

9. Apparatus according to claim 5, wherein said angle sensors have their sensing axes inclined at a predetermined known angle towards the spin axis such that the speed of rotation about the spin axis has a component along the sensing axis of each of said sensors.

10. Apparatus according to claim 5, wherein the computation means are designed to determine the matrix for converting the rotating axis system to a reference axis system constituting the reference frame by high frequency integration of angle increments $\delta\alpha_1$ and $\delta\alpha_2$ each measured over the duration of one sampling period, corresponding to an angle increment $\delta\alpha_3$ measured by the means for measuring the angular position of the carrier.

11. Apparatus according to claim 10, wherein said computation means are designed to perform integration by using the quaternion representation and extracting the angles of inclination from the terms of the matrix for converting from the axis system tied to the carrier to the stationary reference axis system as defined by the position of the privileged axis and by the positions of the mutually orthogonal axes at the instant when integration computation begins.

* * * * *